(12) United States Patent
Yu et al.

(10) Patent No.: US 7,736,720 B2
(45) Date of Patent: Jun. 15, 2010

(54) COMPOSITE LIGHT WEIGHT GYPSUM WALLBOARD

(75) Inventors: Qiang Yu, Grayslake, IL (US); Weixin David Song, Lake Forest, IL (US)

(73) Assignee: United States Gypsum Company, Chicago, IL (US)

(*) Notice: Subject to any disclaimer, the term of this patent is extended or adjusted under 35 U.S.C. 154(b) by 0 days.

(21) Appl. No.: 11/537,395

(22) Filed: Sep. 29, 2006

(65) Prior Publication Data

US 2007/0059513 A1 Mar. 15, 2007

Related U.S. Application Data

(63) Continuation-in-part of application No. 11/449,177, filed on Jun. 7, 2006, and a continuation-in-part of application No. 11/445,906, filed on Jun. 2, 2006.

(60) Provisional application No. 60/688,839, filed on Jun. 9, 2005.

(51) Int. Cl.
*B32B 3/26* (2006.01)
*B32B 13/00* (2006.01)
*C04B 28/14* (2006.01)

(52) U.S. Cl. .................. 428/158; 428/703; 106/778; 52/553; 156/39

(58) Field of Classification Search .......... 428/703, 428/701; 508/105; 106/516; 427/249.6; 423/516; 156/89.13
See application file for complete search history.

(56) References Cited

U.S. PATENT DOCUMENTS

| | | | |
|---|---|---|---|
| 1,500,452 A | 7/1924 | Haggerty | |
| 1,702,729 A | 2/1929 | Hite | |
| 2,322,194 A * | 6/1943 | King | 106/646 |
| 2,803,575 A | 8/1957 | Riddell et al. | |
| 3,513,009 A * | 5/1970 | Austin et al. | 427/277 |
| 3,573,947 A | 4/1971 | Kinkade | |
| 3,944,698 A | 3/1976 | Dierks et al. | |
| 3,993,822 A | 11/1976 | Knauf et al. | |
| 4,184,887 A | 1/1980 | Lange et al. | |
| 4,195,110 A | 3/1980 | Dierks et al. | |
| 4,233,368 A | 11/1980 | Baehr et al. | |
| 4,237,260 A | 12/1980 | Lange et al. | |
| 4,265,979 A | 5/1981 | Baehr et al. | |
| 4,327,146 A * | 4/1982 | White | 428/308.8 |
| 4,392,896 A | 7/1983 | Sakakibara | |
| 5,085,929 A * | 2/1992 | Bruce et al. | 428/309.9 |
| 5,575,844 A | 11/1996 | Bradshaw | |
| 5,643,510 A | 7/1997 | Sucech | |
| 5,922,447 A | 7/1999 | Baig | |
| 5,962,119 A * | 10/1999 | Chan | 428/312.4 |
| 6,110,575 A | 8/2000 | Haga | |
| 6,171,388 B1 | 1/2001 | Jobbins | |
| 6,340,388 B1 | 1/2002 | Luongo | |
| 6,342,284 B1 * | 1/2002 | Yu et al. | 428/70 |
| 6,387,172 B1 | 5/2002 | Yu et al. | |
| 6,391,958 B1 | 5/2002 | Luongo | |
| 6,406,537 B1 | 6/2002 | Immordino | |
| 6,409,824 B1 | 6/2002 | Veeramasuneni et al. | |
| 6,409,825 B1 | 6/2002 | Yu et al. | |
| 6,443,258 B1 | 9/2002 | Putt et al. | |
| 6,485,821 B1 * | 11/2002 | Bruce et al. | 428/304.4 |
| 6,524,679 B2 | 2/2003 | Hauber et al. | |
| 6,613,424 B1 | 9/2003 | Putt et al. | |
| 6,632,550 B1 | 10/2003 | Yu et al. | |
| 6,743,830 B2 | 6/2004 | Soane et al. | |
| 6,746,781 B2 * | 6/2004 | Francis et al. | 428/537.5 |
| 6,780,356 B1 | 8/2004 | Putt et al. | |
| 6,783,587 B2 | 8/2004 | Sethuraman et al. | |
| 6,800,131 B2 | 10/2004 | Yu et al. | |
| 6,841,232 B2 | 1/2005 | Tagge et al. | |

(Continued)

FOREIGN PATENT DOCUMENTS

AU 486746 11/1975

(Continued)

OTHER PUBLICATIONS

"Standard Test Method for Physical Testing of Gypsum Panel Products", Annual Book of ASTM Standards, Designations: C 473-97, vol. 0401 1998, pp. 253-264.

(Continued)

*Primary Examiner*—David R Sample
*Assistant Examiner*—Nicole T Gugliotta
(74) *Attorney, Agent, or Firm*—Drinker Biddle & Reath LLP

(57) ABSTRACT

The invention provides a light weight composite gypsum board including a foamed low density set gypsum core, a top non-foamed (or reduced-foamed) bonding high density layer and a bottom non-foamed (or reduced-foamed) bonding high density layer, a top cover sheet bonded to the foamed low density set gypsum core by the top non-foamed (or reduced-foamed) bonding high density layer, and a bottom cover sheet bonded to the foamed low density set gypsum core by the bottom non-foamed (or reduced-foamed) bonding high density layer. The foamed low density set gypsum core is prepared having a density of less than about 30 pcf using soap foam in the gypsum-containing slurry. The combination of components provide a composite gypsum board having light weight and high strength.

43 Claims, No Drawings

U.S. PATENT DOCUMENTS

| | | |
|---|---|---|
| 6,878,321 B2 | 4/2005 | Hauber et al. |
| 6,983,821 B2 | 1/2006 | Putt et al. |
| 2001/0001218 A1 | 5/2001 | Luongo |
| 2002/0017222 A1 | 2/2002 | Luongo |
| 2002/0112651 A1 | 8/2002 | Yu et al. |
| 2003/0019176 A1 | 1/2003 | Anderson |
| 2003/0084980 A1 | 5/2003 | Seufert et al. |
| 2004/0026002 A1* | 2/2004 | Weldon et al. ................ 156/43 |
| 2004/0092625 A1 | 5/2004 | Pollock et al. |
| 2004/0131714 A1 | 7/2004 | Burke |
| 2004/0231916 A1 | 11/2004 | Englert et al. |
| 2005/0019618 A1 | 1/2005 | Yu et al. |
| 2005/0223949 A1 | 10/2005 | Bailey et al. |

FOREIGN PATENT DOCUMENTS

| | | |
|---|---|---|
| GB | 1250713 | 10/1971 |
| GB | 2053779 A | 2/1981 |
| WO | WO 01/45932 A1 | 6/2001 |

OTHER PUBLICATIONS

*Dilofo®* GW Products Bulletin, "Polynaphthalene Sulfonate, Sodium Salt", GEO Specialty Chemicals, Horsham, PA (Nov. 1999).

*Hyonic® PFM33 Products Bulletin*, "Zero VOC Foaming Agent for Gypsum Wallboard", GEO Specialty Chemicals, Horsham, PA (Jul. 2000).

U.S. Appl. No. 11/267,125, filed Nov. 4, 2005, Baig.

U.S. Appl. No. 11/592,481, filed Nov. 2, 2006, Yu et al.

* cited by examiner

COMPOSITE LIGHT WEIGHT GYPSUM WALLBOARD

This application is a continuation-in-part of U.S. patent application Ser. No. 11/449,177, filed Jun. 7, 2006, and is a continuation-in-part of U.S. patent application Ser. No. 11/445,906, filed Jun. 2, 2006, each one of which claims the benefit of U.S. Provisional Application No. 60/688,839, filed Jun. 9, 2005. The entire disclosures of each of the foregoing patent applications are hereby incorporated by reference.

FIELD OF THE INVENTION

This invention pertains to unique light weight composite gypsum boards having high strength. It also pertains to a method of making such light weight composite gypsum boards using a unique gypsum-containing slurry to form a foamed low density set gypsum core and non-foamed (or reduced-foamed) bonding high density layers that bond the top and bottom cover sheets to the core.

BACKGROUND OF THE INVENTION

Certain properties of gypsum (calcium sulfate dihydrate) make it very popular for use in making industrial and building products, such as gypsum wallboard. Gypsum is a plentiful and generally inexpensive raw material which, through a process of dehydration and rehydration, can be cast, molded or otherwise formed into useful shapes. The base material from which gypsum wallboard and other gypsum products are manufactured is the hemihydrate form of calcium sulfate ($CaSO_4 \cdot \frac{1}{2}H_2O$), commonly termed "stucco," which is produced by heat conversion of the dihydrate form of calcium sulfate ($CaSO_4 \cdot 2H_2O$), from which $1-\frac{1}{2}$ water molecules been removed.

Conventional gypsum-containing products such as gypsum wallboard have many advantages, such as low cost and easy workability. Various improvements have been achieved in making gypsum-containing products using starches as ingredients in the slurries used to make such products. Pregelatinized starch, for example, can increase flexural strength and compressive strength of gypsum-containing products including gypsum wallboard. Known gypsum wall board contains board starch at levels of less than about 10 lbs/MSF.

It is also necessary to use substantial amounts of water in gypsum slurries containing pregelatinized starch in order ensure proper flowability of the slurry. Unfortunately, most of this water must eventually be driven off by drying, which is expensive due to the high cost of the fuels used in the drying process. The drying step is also time-consuming. It has been found that the use of naphthalenesulfonate dispersants can increase the fluidity of the slurries, thus overcoming the water demand problem. In addition, it has also been found that the naphthalenesulfonate dispersants, if the usage level is high enough, can cross-link to the pregelatinized starch to bind the gypsum crystals together after drying, thus increasing dry strength of the gypsum composite. Trimetaphosphate salts have not in the past been recognized to affect gypsum slurry water requirements. However, the present inventors have discovered that increasing the level of the trimetaphosphate salt to hitherto unknown levels in the presence of a specific disperant makes it possible to achieve proper slurry flowability with unexpectedly reduced amounts of water, even in the presence of high starch levels. This, of course, is highly desirable because it in turn reduces fuel usage for drying as well as the process time associated with subsequent water removal process steps. Thus the present inventors have also discovered that the dry strength of gypsum board can be increased by using a naphthalenesulfonate disperant in combination with pregelatinized starch in the slurry used to make the wallboard.

Conventional gypsum wallboards have adequate strength for working, and meet standard test requirements such as nail pull (77 lb) and core hardness (11 lb). However, conventional wallboards are heavy, typically weighing up to 1600-1700 lb/MSF. If a way could be fund to produce a high strength gypsum wall board in which board weight (and density) is significantly reduced, without adversely affecting nail pull and hardness characteristics, this would represent a useful contribution to the art.

It is also known in making gypsum wallboard that bonding layers can be used to promote adherence or bonding of the paper cover sheets to the set gypsum core. Typically, these bonding layers are relatively thick, ranging from about 7 mils to about 25 mils, even up to 50 mils. Thinner bonding layers would be expected to be more difficult to apply and to present other drawbacks. Unfortunately, the use of these thick bonding layers can decrease the core hardness in the finished wallboard. Finished densities in these dried bonding layers range from greater than about 70 pcf to about 90 pcf. The term "pcf" is defined as pounds per cubic foot ($lb/ft^3$). If a way could be found to make a low density set gypsum board using thinner, lighter bonding layers, without sacrificing core hardness or other important board properties, this would represent a useful contribution to the art.

BRIEF SUMMARY OF THE INVENTION

The invention generally comprises a light weight gypsum composite board including a foamed low density set gypsum core having a top surface and a bottom surface, the foamed low density set gypsum core made using a gypsum-containing slurry comprising stucco, and based on the weight of stucco, pregelatinized starch in an amount of about 0.5-10% by weight, a naphthalenesulfonate dispersant in an amount of about 0.1-3.0% by weight and sodium trimetaphosphate in an amount of about 0.12-0.4% by weight, the light weight gypsum composite board also including a top non-foamed (or reduced-foamed) bonding high density layer covering the top surface of the foamed low density set gypsum core, a bottom non-foamed (or reduced-foamed) bonding high density layer covering the bottom surface of the foamed low density set gypsum core, a top cover sheet, and a bottom cover sheet, wherein the top cover sheet is bonded to the foamed low density set gypsum core by the top non-foamed (or reduced-foamed) bonding high density layer, and the bottom cover sheet is bonded to the foamed low density set gypsum core by the bottom non-foamed (or reduced-foamed) bonding high density layer.

The top and bottom non-foamed (or reduced-foamed) bonding high density layers of the light weight gypsum composite board comprise from about 10% by weight to about 16% by weight of the total amount of the gypsum-containing slurry. In a preferred embodiment, the top non-foamed (or reduced-foamed) bonding high density layer covering the top surface of the foamed low density set gypsum core comprises about 6%-9% by weight of the total amount of the gypsum-containing slurry, and the bottom non-foamed (or reduced-foamed) bonding high density layer covering the bottom surface of the foamed low density set gypsum core comprising about 4%-6% by weight of the total amount of the gypsum-containing slurry.

DETAILED DESCRIPTION OF THE INVENTION

It has now unexpectedly been found that the preparation of a foamed low density set gypsum core using thinner, lighter top and bottom non-foamed (or reduced-foamed) bonding high density layers to attain good bonding of a heavy top (face) cover sheet and a bottom (back) cover sheet, can provide a composite gypsum board having nail pull resistance, core hardness, and board strength.

The composite gypsum board of the present invention includes a foamed low density set gypsum core having a top surface and a bottom surface, a top non-foamed (or reduced-foamed) bonding high density layer covering the top surface of the foamed low density set gypsum core, a top (or face) cover sheet having a foamed low density set gypsum core-facing surface, the top cover sheet bonded to the foamed low density set gypsum core by the top non-foamed (or reduced-foamed) bonding high density layer, a bottom non-foamed (or reduced-foamed) bonding high density layer covering the bottom surface of the foamed low density set gypsum core, and a bottom (or back) cover sheet having a foamed low density set gypsum core-facing surface, the bottom cover sheet bonded to the foamed low density set gypsum core by the bottom non-foamed (or reduced-foamed) bonding high density layer. Preferably the top cover sheet will be paper having a weight of about 60 lb/MSF (thickness about 18 mils). Additionally, the top (face) cover sheet and bottom (back) cover sheet are substantially parallel with respect to the foamed low density set gypsum core. The foamed low density set gypsum core is made from a foamed gypsum slurry containing stucco, and includes pregelatinized starch, and preferably a naphthalenesulfonate dispersant, and also preferably, sodium trimetaphosphate. The top and bottom non-foamed (or reduced-foamed) bonding high density layers can comprise from about 10% to about 16% of the of the total amount of gypsum slurry.

According to one embodiment of the present invention, there are provided finished composite gypsum board from gypsum-containing slurries containing stucco, pregelatinized starch, a naphthalenesulfonate disperant, and sodium trimetaphosphate. The naphthalenesulfonate disperant is present in an amount of about 0.1%-3.0% by weight based on the weight of dry stucco. The pregelatinized starch is present in an amount of at least about 0.5% by weight up to about 10% by weight based on the weight of dry stucco in the formulation. The sodium trimetaphosphate is present in an amount of about 0.12%-0.4% by weight based on the weight of dry stucco in the formulation. Other ingredients that may be used in the slurry include binders, paper fiber, glass fiber, and accelerators. A soap foam which introduces air voids is added to the newly formulated gypsum-containing slurries to help reduce the density of the foamed low density set gypsum core in the final gypsum-containing product, for example, gypsum wallboard or composite gypsum board.

The combination of from about 0.5% by weight up to about 10% by weight pregelatinized starch, from about 0.1% by weight up to about 3.0% by weight naphthalenesulfonate dispersant, and a minimum of at least about 0.12% by weight up to about 0.4% by weight of trimetaphosphate salt (all based on the weight of dry stucco used in the gypsum slurry) unexpectedly and significantly increases the fluidity of the gypsum slurry. This substantially reduces the amount of water required to produce a gypsum slurry with sufficient flowability to be used in making gypsum-containing products such as gypsum wall board. The level of trimetaphosphate salt, which is at least about twice that of standard formulations (as sodium trimetaphosphate), is believed to boost the dispersant activity of the naphthalenesulfonate dispersant.

The air voids can reduce the bonding strength between a foamed low density set gypsum core and the cover sheets. Since greater than half of the composite gypsum boards by volume may consist of voids due to foam, the foam can interfere with the bond between the foamed low density set gypsum core and the paper cover sheets. This is addressed by providing a non-foamed (or reduced-foamed) bonding high density layer on the gypsum core-contacting surfaces of both the top cover sheet and the bottom cover sheet prior to applying the cover sheets to the core. This non-foamed, or alternatively, reduced-foamed, bonding high density layer formulation typically will be the same as that of the gypsum slurry core formulation, except that either no soap will be added, or a substantially reduced amount of soap (foam) will be added. Optionally, in order to form this bonding layer, foam can be mechanically removed from the core formulation, or a different foam-free formulation can be applied at the foamed low density set gypsum core face paper interface.

Soap foam is required to introduce and to control the air (bubble) void sizes and distribution in the foamed set gypsum core, and to control the density of the foamed set gypsum core. A preferred range of soap in the set gypsum core is from about 0.2 lb/MSF to about 0.7 lb/MSF; a more preferred level of soap is about 0.3 lb/MSF to about 0.5 lb/MSF. Although preferably no soap will be used in the non-foamed bonding high density layers, if soap is used in reduced-foamed bonding high density layers, the amount will be about 5% by weight or less of the amount of soap to make the foamed low density set gypsum core.

The non-foamed or reduced-foamed, that is, high density portion of the gypsum-containing slurry used in the bonding layer will be from about 10-16% by weight of the (wet) slurry used in making the final board. In a preferred embodiment, 6-9% by weight of the slurry can be used as the top non-foamed (or reduced-foamed) bonding high density layer, and 4-7% by weight of the slurry can be used as the bottom non-foamed (or reduced-foamed) bonding high density layer. The presence of the top and bottom non-foamed (or reduced-foamed) bonding high density layers provides an improved bond between the top and bottom cover sheets and the foamed low density set gypsum core. The wet density of the non-foamed bonding high density layer can be about 80-85 pcf. The dry (finished) density of the non-foamed (or reduced-foamed) bonding high density layer can be about 45-70 pcf. Additionally, the thickness of the non-foamed (or reduced-foamed) bonding high density layers of the present invention will range from about 2 mils to less than 7 mils.

Preferred cover sheets may be made of paper as in conventional gypsum wallboard, although other useful cover sheet materials known in the art (e.g. fibrous glass mates) may be used. However, particular heavy paper cover sheets preferably will be used as top (face) cover sheets in the embodiments of the present invention. Useful cover sheet paper include Manila 7-ply and News-Line 5-ply, available from United States Gypsum Corporation, Chicago, Ill.; and Grey-Back 3-ply and Manila Ivory 3-ply, available from Caraustar, Newport, Ind. A preferred bottom cover sheet paper is 5-ply News-Line (e.g. 42-46 lb/MSF). A preferred top cover sheet paper is Manila 7-ply. A particularly preferred top cover sheet paper is heavy Manila paper (60 lb/MSF, thickness 18 mils), available from Caraustar, Newport, Indiana. Other heavy, thick paper will also be preferred, ranging in thickness from about 15-20 mils.

Fibrous mats may also be used as one or both of the cover sheets. Preferably the fibrous mats will be nonwoven glass fiber mats in which filaments of glass fiber are bonded together by an adhesive. Most preferably, the nonwoven glass fiber mats will have a heavy resin coating. For example, Duraglass nonwoven glass fiber mats, available from John-Manville, having a weight of about 1.5 lb/100 ft$^2$, with about 40-50% of the mat weight coming from the resin coating, could be used.

It is noted here that in manufacturing of conventional gypsum, wallboard, the top or face paper is laid down and moves along the production line first, and so constitutes what is known in the art as the "bottom" of the process, despite contacting and forming the top or face of the wallboard product. Conversely, the bottom or back paper is applied last in the manufacturing process in what is known as the "top" of the process. These same conventions will apply in the formation and preparation of the composite gypsum boards of the present invention. Reference is made to Example 7B below.

It is preferred that a naphthalenesulfonate dispersant by used in gypsum-containing slurries prepared in accordance with the present invention. The naphthalenesulfonate dispersants used in the present invention include polynaphthalenesulfonic acid and its salts (polynaphthalenesulfonates) and derivatives, which are condensation products of naphthalenesulfonic acids and formaldehyde. Particularly desirable polynaphthalenesulfonates include sodium and calcium naphthalenesulfonate. The average molecular weight of the naphthalenesulfonates can range from about 3,000 to 27,000, although it is preferred that the molecular weight be about 8,000 to 22,000, and more preferred that the molecular weight be about 12,000 to 17,000. As a commercial product, a higher molecular weight dispersant has higher viscosity, and lower solids content, than a lower molecular weight dispersant. Useful naphthalenesulfonates include DILOFLO, available from GEO Specialty Chemicals, Cleveland, Ohio; DAXAD, available from Hampshire Chemical Corp., Lexington, Mass.; and LOMAR D, available from GEO Specialty Chemicals, Lafayette, Ind. The naphthalenesulfonates are preferably used as aqueous solutions in the range 35-55% by weight solids content, for example. It is most preferred to use the naphthalenesulfonates in the form of an aqueous solution, for example, in the range of about 40-45% by weight solids content. Alternatively, where appropriate, the naphthalenesulfonates can be used in dry solid or powder form, such as LOMAR D, for example.

The polynaphthalenesulfonates useful in the present invention have the general structure (1):

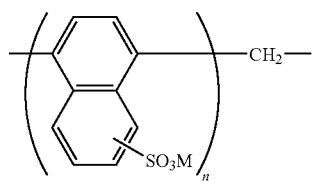

wherein n is>2, and wherein M is sodium, potassium, calcium, and the like.

The naphthalenesulfonate dispersant, preferably as an about 45% by weight solution in water, may be used in a range of from about 0.5% to about 3.0% by weight based on the weight of dry stucco used in the gypsum composite formulation. A more preferred range of naphthalenesulfonate dispersant is from about 0.5% to about 2.0% by weight based on the weight of dry stucco, and a most preferred range from about 0.7% to about 2.0% by weight based on the weight of dry stucco. In contrast, known gypsum wallboard contains this dispersant at levels of about 0.4% by weight, or less, based on the weight of dry stucco.

Stated in an another way, the naphthalenesulfonate disperant, on a dry weight basis, may be used in a range from about 0.1% to about 1.5% by weight based of the weight of dry stucco used in the gypsum composite formulation. A more preferred range of naphthalenesulfonate dispersant, on a dry solids basis, is from about 0.25% to about 0.7% by weight based on the weight of dry stucco, and a most preferred range (on a dry solids basis) from about 0.3% to about 0.7% by weight based on the weight of dry stucco.

The gypsum-containing slurry can optionally contain a trimetaphosphate salt, for example, sodium trimetaphosphate. Any suitable water-soluble metaphosphate or polyphosphate can be used in accordance with the present invention. It is preferred that a trimetaphosphate salt be used, including double salts, that is trimetaphosphate salts having two cations. Particularly useful trimetaphosphate salts include sodium trimetaphosphate, potassium trimetaphosphate, calcium trimetaphosphate, sodium calcium trimetaphosphate, lithium trimetaphosphate, ammonium trimetaphosphate, and the like, or combinations thereof. A preferred trimetaphosphate salt is sodium trimetaphosphate. It is preferred to use the trimetaphosphate salt as an aqueous solution, for example, in the range of about 10-15% by weight solids content. Other cyclic or acyclic polyphosphate can also be used, as described in U.S. Pat. No. 6,409,825 to Yu et al., herein incorporated by reference.

Sodium trimetaphosphate is a known additive in gypsum-containing compositions, although it is generally used in a range of from about 0.05% to about 0.08% by weight based on the weight of dry stucco used in the gypsum slurry. In the embodiments of the present invention, sodium trimetaphosphate (or other water-soluble metaphosphate or polyphosphate) can be present in the range of from about 0.12% to about 0.4% by weight based on the weight of dry stucco used in the gypsum composite formulation. A preferred range of sodium trimetaphosphate (or other water-soluble metaphosphate or polyphosphate) is from about 0.12% to about 0.3% by weight based on the weight of dry stucco used in the gypsum composite formulation.

There are two forms of stucco, alpha and beta. These two types of stucco are produced by different means of calcification. In the present inventions either the beta or the alpha form of stucco may be used.

Starches, including pregelatinized starch in particular, must be used in gypsum-containing slurries prepared in accordance with the present invention. A preferred pregelatinized starch is pregelatinized corn starch, for example pregelatinized corn flour available from Bunge Milling, St. Louis, Mo., having the following typical analysis: moisture 7.5%, protein 8.0%, oil 0.5%, crude fiber 0.5%, ash 0.3%; having a green strength of 0.48 psi; and having a loose bulk density of 35.0 lb/ft$^3$. Pregelatinized corn starch should be used in an amount of at least about 0.5% by weight up to about 10% by weight, based on the weight of dry stucco used in the gypsum-containing slurry.

The present inventors have further discovered that an unexpected increase in dry strength (particularly in wallboard) can be obtained by using at least about 0.5% by weight up to about 10% by weight pregelatinized starch (preferably pregelatinized corn starch) in the presence of about 0.1% by weight to 3.0% by weight naphthalenesulfonate dispersant (starch and naphthalenesulfonate levels based on the weight of dry stucco present in the formulation). This unexpected result can be obtained whether or not water-soluble metaphosphate or polyphosphate is present.

In addition, it has unexpectedly been found that pregelatinized starch can be used at levels of at least about 10 lb/MSF, or more, in the dried gypsum wallboard made in accordance with the present invention, yet high strength and low weight can be achieved. Levels as high as 35-45 lb/MSF pregelatinized starch in the gypsum wallboard have been shown to be effective. As an example, Formulation B, as shown in Tables 1 and 2 below, includes 45 lb/MSF, yet produced a board weight of 1042 lb/MSF having excellent strength. In this example (Formulation B), a naphthalenesulfonate dispersant as a 45% by weight solution in water, was used at a level of 1.28% by weight.

A further unexpected result may be achieved with the present invention when the naphthalenesulfonate dispersant trimetaphosphate salt combination is combined with pregelatinized corn starch, and optionally, paper fiber or glass fiber. Gypsum wallboard made from formulations containing these three ingredients have increased strength and reduced weight, and are more economically desirable due to the reduced water requirements in their manufacture.

Accelerators can be used in the gypsum-containing compositions of the present invention, as described in U.S. Pat. No. 6,409,825 to Yu et al., herein incorporated by reference. One desirable heat resistant accelerator (HRA) can be made from the dry grinding of landplaster (calcium sulfate dihydrate). Small amounts of additives (normally about 5% by weight) such as sugar, dextrose, boric acid, and starch can be used to make this HRA. Sugar, or dextrose, is currently preferred. Another useful accelerator is "climate stabilized accelerator" or "climate stable accelerator," (CSA) as described in U.S. Pat. No. 3,573,947, herein incorporated by reference.

Water/stucco (w/s) ratio is an important parameter, since excess water must eventually be driven off by heating. In the embodiments of the present invention, a generally preferred w/s ratio is from about 0.7 to about 1.3. A more preferred w/s ratio in the main gypsum slurry formulations should be in the range from 0.8-1.2.

Other gypsum slurry additives can include accelerators, binders, waterproofing agents, paper or glass fibers and other known constituents.

The following examples further illustrate the invention. They should not be construed as in any way limiting the scope of the invention.

EXAMPLE 1

Sample Gypsum Slurry Formulations

Gypsum slurry formulations are shown in Table 1 below. All values in Table 1 are expressed as weight percent based on the weight of dry stucco. Values in parentheses are dry weight in pounds (lb/MSF).

TABLE 1

| Component | Formulation A | Formulation B |
|---|---|---|
| Stucco (lb/MSF) | (732) | (704) |
| sodium trimetaphosphate | 0.20 (1.50) | 0.30 (2.14) |

TABLE 1-continued

| Component | Formulation A | Formulation B |
|---|---|---|
| Dispersant (naphthalenesulfonate) | 0.18 (1.35) | 0.58[1] (4.05) |
| Pregelatinized starch (dry powder) | 2.7 (20) | 6.4 (45) |
| Board starch | 0.41 (3.0) | 0 |
| Heat resistant accelerator (HRA) | (15) | (15) |
| Glass fiber | 0.27 (2.0) | 0.28 (2.0) |
| Paper fiber | 0 | 0.99 (7.0) |
| Soap* | 0.03 (0.192) | 0.03 (0.192) |
| Total Water (lb.) | 805 | 852 |
| Water/Stucco ratio | 1.10 | 1.21 |

*Used to pregenerate foam
[1] 1.28% by weight as a 45% aqueous solution.

EXAMPLE 2

Preparation of Wallboards

Sample gypsum wallboards wee prepared in accordance with U.S. Pat. No. 6,342,284, to Yu et al. and U.S. Pat. No. 6,632,550 to Yu et al., herein incorporated by reference. This includes the separate generation of foam and introduction of the foam into the slurry of all of the other ingredients as described in Example 5 of these patents.

Test results for gypsum wallboards made using the Formulation A and B of Example 1, and a normal control board are shown in Table 2 below. As in this example and other examples below, nail pull resistance, core hardness, and flexural strength tests were performed according to ASTM C-473. Additionally, it is noted that typical gypsum wallboard is approximately ½ inch thick and has a weight of between about 1600 to 1800 pounds per 1,000 square feet of material, or lb/MSF. ("MSF" is a standard abbreviation in the art for a thousand square feet; it is an area measurement for boxes, corrugated media and wallboard.)

TABLE 2

| Lab test result | Control Board | Formulation A Board | Formulation B Board |
|---|---|---|---|
| Board weight (lb/MSF) | 1587 | 1066 | 1042 |
| Nail pull resistance (lb) | 81.7 | 50.2 | 72.8 |
| Core hardness (lb) | 16.3 | 5.2 | 11.6 |
| Humidified bond load (lb) | 17.3 | 20.3 | 15.1 |
| Humidified bond failure (%) | 0.6 | 5 | 11.1 |
| Flexural strength, face-up (MD) (lb) | 47 | 47.2 | 52.6 |
| Flexural strength, face-down (MD) (lb) | 51.5 | 66.7 | 78.8 |
| Flexural strength, face-up (XMD) (lb) | 150 | 135.9 | 173.1 |
| Flexural strength, face-down (XMD) (lb) | 144.4 | 125.5 | 165.4 |

MD: machine direction
XMD: across machine direction

As illustrated in Table 2, gypsum wallboards prepared using the Formulation A and B slurries have significant reductions in weight compared to the control board. With reference again to Table 1, the comparisons of the Formulation A board to the Formulation B board are most striking. The water/stucco (w/s) ratios are similar in Formulation A and Formulation B. A significantly higher level of naphthalenesulfonate dispersant is also used in Formulation B. Also, in Formulation B substantially more pregelatinized starch was used, about 6% by weight, a greater than 100% increase over Formulation A accompanied by marked strength increases. Even so, the water demand to produce the required flowability remained low in the Formulation B slurry, the difference being about 10% in comparison to Formulation A. The low water demand in both Formulations is attributed to the synergistic effect of the combination of naphthalenesulfonate dispersant and sodium trimetaphosphate in the gypsum slurry, which increases the fluidity of the gypsum slurry, even in the presence of a substantially higher level of pregelatinized starch.

As illustrated in Table 2, the wallboard prepared using the Formulation B slurry has substantially increased strength compared with the wallboard prepared using the Formulation A slurry. By incorporating increased amounts of pregelatinized starch in combination with increased amounts of naphthalenesulfonate dispersant and sodium trimetaphosphate, nail pull resistance in the Formulation B board improved by 45% over the Formulation A board. Substantial increases in flexural strength were also observed in the Formulation B board as compared to the Formulation A board.

EXAMPLE 3

½ Inch Gypsum Wallboard Weight Reduction Trials

Further gypsum wallboard examples (Boards C, D and E), including slurry formulations and test results are shown in Table 3 below. The slurry formulations of Table 3 include the major components of the slurries. Values in parentheses are expressed as weight percent based on the weight of dry stucco.

increased starch formulated in a usable, flowable slurry, while maintaining the same w/s ratio and adequate strength.

EXAMPLE 4

Wet Gypsum Cube Strength Test

The wet cube strength tests were carried out by using Southard CKS board stucco, available from United States Gypsum Corp., Chicago, Ill. and tap water in the laboratory to determine their wet compressive strength. The following lab test procedure was used.

Stucco (1000 g), CSA (2 g), and tap water (1200 cc) at about 70° F. were used for each wet gypsum cube cast. Pregelatinized corn starch (20 g, 2.0% based on stucco wt.) and CSA (2 g, 0.2% based on stucco wt.) were thoroughly dry mixed first in a plastic bag with the stucco prior to mixing with a tap water solution containing both naphthalenesulfonate dispersant and sodium trimetaphosphate. The dispersant used was DILOFLO dispersant (1.0-2.0%, as indicated in Table 4). Varying amounts of sodium trimetaphosphate were used also as indicated in Table 4.

The dry ingredients and aqueous solution were initially combined in a laboratory Warning blender, the mixture produced allowed to soak for 10 sec, and then the mixture was mixed at low speed for 10 sec in order to make the slurry. The slurries thus formed were cast into three 2"×2"×2" cube molds. The cast cubes were then removed from the molds, weighted, and sealed inside plastic bags to prevent moisture loss before the compressive strength test was performed. The compressive strength of the wet cubes was measured using an

TABLE 3

|  | Control Board | Formulation C Board | Formulation D Board | Formulation E Board |
| --- | --- | --- | --- | --- |
| Trial formulation component/parameter |  |  |  |  |
| Dry stucco (lb/MSF) | 1300 | 1281 | 1196 | 1070 |
| Accelerator (lb/MSF) | 9.2 | 9.2 | 9.2 | 9.2 |
| DILOFLO[1] (lb/MSF) | 4.1 (0.32%) | 8.1 (0.63%) | 8.1 (0.68%) | 8.1 (0.76%) |
| Regular starch (lb/MSF) | 5.6 (0.43%) | 0 | 0 | 0 |
| Pregelatinized corn starch (lb/MSF) | 0 | 10 (0.78%) | 10 (0.84%) | 10 (0.93%) |
| Sodium trimetaphosphate (lb/MSF) | 0.7 (0.05%) | 1.6 (0.12%) | 1.6 (0.13%) | 1.6 (0.15%) |
| Total water/stucco ratio (w/s) | 0.82 | 0.82 | 0.82 | 0.84 |
| Trial formulation test results |  |  |  |  |
| Dry board weight (lb/MSF) | 1611 | 1570 | 1451 | 1320 |
| Nail pull resistance (lb) | 77.3[†] | 85.5 | 77.2 | 65.2 |

[†]ASTM standard: 77 lb
[1]DILOFLO is a 45% Naphthalensulfonate solution in water As illustrated in Table 3, Boards C, D, and E were made from a slurry having substantially increased amounts of starch, DILOFLO dispersant, and sodium trimetaphosphate in comparison with the control board (about a two-fold increase on a percentage basis for the starch an dispersant, and a two- or three-fold increase for the trimetaphosphate), while maintaining the w/s ratio constant. Nevertheless, board weight was significantly reduced and strength as measured by nail pull resistance was not dramatically affected. Therefore, in this example of an embodiment of the invention, the new formulation (such as, for example, Board D) can provide ATS machine and recorded as an average in pounds per square inch (psi). The results obtained were as follows:

TABLE 4

| Test Sample No. | Sodium trimetaphosphate, grams (wt % based on dry stucco) | DILOFLO[1] (wt % based on dry stucco) | Wet cube weight (2" × 2" × 2"), g | Wet cube compressive strength, psi |
| --- | --- | --- | --- | --- |
| 1 | 0 | 1.5 | 183.57 | 321 |

TABLE 4-continued

| Test Sample No. | Sodium trimetaphosphate, grams (wt % based on dry stucco) | DILOFLO[1] (wt % based on dry stucco) | Wet cube weight (2" × 2" × 2"), g | Wet cube compressive strength, psi |
|---|---|---|---|---|
| 2 | 0.5 (0.05) | 1.5 | 183.11 | 357 |
| 3 | 1 (0.1) | 1.5 | 183.19 | 360 |
| 4 | 2 (0.2) | 1.5 | 183.51 | 361 |
| 5 | 4 (0.4) | 1.5 | 183.65 | 381 |
| 6 | 10 (1.0) | 1.5 | 183.47 | 369 |
| 7 | 0 | 1.0 | 184.02 | 345 |
| 8 | 0.5 (0.05) | 1.0 | 183.66 | 349 |
| 9 | 1 (0.1) | 1.0 | 183.93 | 356 |
| 10 | 2 (0.2) | 1.0 | 182.67 | 366 |
| 11 | 4 (0.4) | 1.0 | 183.53 | 365 |
| 12 | 10 (1.0) | 1.0 | 183.48 | 341 |
| 13 | 0 | 2.0 | 183.33 | 345 |
| 14 | 0.5 (0.05) | 2.0 | 184.06 | 356 |
| 15 | 1 (0.1) | 2.0 | 184.3 | 363 |
| 16 | 2 (0.2) | 2.0 | 184.02 | 363 |
| 17 | 4 (0.4) | 2.0 | 183.5 | 368 |
| 18 | 10 (1.0) | 2.0 | 182.68 | 339 |

[1]DILOFLO is a 45% Naphthalensulfonate solution in water

As illustrated in Table 4, Samples 4-5, 10-11, and 17, having levels of sodium trimetaphosphate in the about 0.12-0.4% range of the present invention generally provided superior wet cube compressive strength as compared to samples with sodium trimetaphosphate outside this range.

EXAMPLE 5

½ Inch Light Weight Gypsum Wallboard Plant Production Trials

Further trials were performed (Trial Boards 1 and 2), including slurry formulations and test results are shown in Table 5 below. The slurry formulations of Table 5 include the major components of the slurries. Values in parentheses are expressed as weight percent based on the weight of dry stucco.

TABLE 5

| Trial formulation component/parameter | Control Board 1 | Plant Formulation Trial Board 1 | Control Board 2 | Plant Formulation Trial Board 2 |
|---|---|---|---|---|
| Dry stucco (lb/MSF) | 1308 | 1160 | 1212 | 1120 |
| DILOFLO[1] (lb/MSF) | 5.98 (0.457%) | 7.98 (0.688%) | 7.18 (0.592%) | 8.99 (0.803%) |
| Regular starch (lb/MSF) | 5.0 (0.38%) | 0 | 4.6 (0.38%) | 0 |
| Pregelatinized corn starch (lb/MSF) | 2.0 (0.15%) | 10 (0.86%) | 2.5 (0.21%) | 9.0 (0.80%) |
| Sodium trimetaphosphate (lb/MSF) | 0.7 (0.05%) | 2.0 (0.17%) | 0.6 (0.05%) | 1.6 (0.14%) |
| Total water/stucco ratio (w/s) | 0.79 | 0.77 | 0.86 | 0.84 |
| Trial formulation test results | | | | |
| Dry board weight (lb/MSF) | 1619 | 1456 | 1553 | 1443 |
| Nail pull resistance (lb) | 81.5† | 82.4 | 80.7 | 80.4 |
| Flexural strength, average (MD) (lb) | 41.7 | 43.7 | 44.8 | 46.9 |
| Flexural strength, average (XMD) (lb) | 134.1 | 135.5 | 146 | 137.2 |
| Humidified bond[2] load, average (lb) | 19.2 | 17.7 | 20.9 | 19.1 |
| Humidified bond[2,3] failure (%) | 1.6 | 0.1 | 0.5 | 0 |

†ASTM standard: 77 lb
MD: machine direction
XMD: across machine direction
[1]DILOFLO is a 45% Naphthalensulfonate solution in water
[2]90° F./90% Relative Humidity
[3]It is well understood that under these test conditions, percentage failure rates <50% are acceptable As illustrated in Table 5, Trial Boards 1 and 2 were made from a slurry having substantially increased amounts of starch, DILOFLO dispersant, and sodium trimetaphosphate, while slightly decreasing the w/s ratio, in comparison with the control boards. Nevertheless, strength as measured by nail pull resistance and flexural testing was maintained or improved, and board weight was significantly reduced. Therefore, in this example of an embodiment of the invention, the new formulation (such as, for example, Trial Boards 1 and 2) can provide increased trimetaphosphate and starch formulated in a usable, flowable slurry, while maintaining substantially the same w/s ratio and adequate strength.

EXAMPLE 6

½ Inch Ultra-Light Weight Gypsum Wallboard Plant Production Trials

Further trials were performed (Trial Boards 3 and 4) using Formulation B (Example 1) as in Example 2, except that the pregelatinized corn starch was prepared with water at 10% concentration (wet starch preparation) and a blend of HYONIC 25 AS and PFM 33 soaps (available from GEO Specialty Chemicals, Lafayette, Ind.) was used. For example, Trial Board 3 was prepared with a blend of HYONIC 25 AS and PFM 33 ranging from 65-70% by weight of 25AS, and the balance PFM 33. For example, Trial Board 4 was prepared with a 70/30 wt./wt. blend of HYONIC 25AS/HYONIC PFM 33. The trial results are shown in Table 6 below.

TABLE 6

| Lab test result | Trial Board 3 (Formulation B plus HYONIC soap blend 65/35) (n = 12) | Trial Board 4 (Formulation B plus HYONIC soap blend 70/30) (n = 34)* |
|---|---|---|
| Board weight (lb/MSF) | 1106 | 1013 |
| Nail pull resistance$^a$ (lb) | 85.5 | 80.3 |
| Core hardness$^b$ (lb) | >15 | 12.4 |
| Flexural strength, average$^c$ (MD) (lb) | 55.6 | 60.3$^1$ |
| Flexural strength, average$^d$ (XMD) (lb) | 140.1 | 142.3$^1$ |

*Except as marked,
$^1$n = 4
MD: machine direction
XMD: across machine direction
$^a$ASTM standard: 77 lb
$^b$ASTM standard: 11 lb
$^c$ASTM standard: 36 lb
$^d$ASTM standard: 107 lb As illustrated in Table 6, strength characteristics as measured by nail pull and core hardness were above the ASTM standard. Flexural strength was also measured to be above the ASTM standard. Again, in this example of an embodiment of the invention, the new formulation (such as, for example, Trial Boards 3 and 4) can provide increased trimetaphosphate and starch formulated in a usable, flow slurry, while maintaining adequate strength.

EXAMPLE 7

½ Inch Ultra-Light Weight Composite Gypsum Board.

A. Slurry Formulation

A representative gypsum slurry formulation for producing gypsum composite board is shown in Table 7, below. All values in Table 7 are expressed as weight percent based on the weight of dry stucco. Values in parentheses are dry weight in pounds (lb/MSF).

TABLE 7

| Component | Formulation C |
|---|---|
| Stucco (lb/MSF) | (714) |
| sodium trimetaphophate | 0.315 (2.25) |
| Dispersant (naphthalenesulfonate) | 0.630$^1$ (4.50) |
| Pregelatinized starch$^2$ | 6.30 (45.0) |
| Heat resistant accelerator (HRA) | (15) |
| Glass fiber | 0.560 (4.00) |
| Paper fiber | 1.12 (8.00) |
| Soap* | 0.03 (0.192) |
| Total Water (lb) | 931 |
| Water/Stucco ratio | 1.30 |

*Used to pregenerate foam.
Note:
10–14% by weight of slurry was not treated with soap foam.
$^1$1.40% by weight as a 45% aqueous solution.
$^2$Pregel starch can be added as a dry powder, or alternatively, as 10% pre-dispersed starch in water (wet starch preparation).

B. Preparation of Composite Boards with Dry Pregelatinized Starch

The composite boards were prepared as in Example 2, using Formulation C above, with the following exceptions. Dry powder pregelatinized corn starch was used to prepare the slurry. Heavy Manila paper (60 lb/MSF, caliper 0.018 in.) was used as the top (face) cover sheet, to which was applied 6-8% by weight of the non-foamed high density gypsum slurry having a wet density of 80 pcf across the entire surface of the paper. After application of the main foamed slurry, the bottom (back) cover sheet was applied, (News-Line paper—42 lb/MSF, caliper 0.0125 in.) which included on its gypsum core-facing surface 4-6% by weight of the non-foamed high density gypsum slurry having a wet density of 80-85 pcf, across the entire surface of the paper.

C. Preparation of Composite Boards with Wet Pregelatinized Starch

Composite boards were prepared as set forth above, except that the pregelatinized corn starch was prepared in solution with water at 10% concentration (wet starch preparation).

EXAMPLE 8

Testing of ½ Inch Ultra-Light Weight Composite Gypsum Board

Test results for composite gypsum boards prepared in Examples 7B and 7C are shown in Table 8 below. As in this example and other examples, nail pull resistance, core hardness, and flexural strength tests were performed according to ASTM C-473. 2 ft.×4 ft. trial board samples were tested after conditioning at 70° F./50% R.H.

TABLE 8

| Lab test result | Ex. 7B. Composite Board (Dry Starch) (n = 8) | Ex. 7C. Composite Board (Wet Starch) (n = 8) |
|---|---|---|
| Board weight (lb/MSF) | 1041 | 1070 |
| Nail pull resistance (lb) | 69.6 | 83.1 |
| Core hardness (lb) | 9.4 | 10.9 |
| Paper-to-core Bond (face/back) | Good/ok | Good/ok |

As illustrated in Table 8, the Example 7C, composite board exceeds the ASTM standard for nail pull resistance, and essentially meets the core hardness standard (see Table 6). This demonstrates that the use of strong, heavy face paper and regular back paper, both adhered to a low density core using a non-foamed high density bonding layer, can provide a board having light weight, and increased strength.

The use of the terms "a" and "an" and "the" an similar referents in the context of describing the invention (especially in the context of the following claims) are to be construed to cover both the singular and the plural, unless other wise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A composite light weight gypsum composite board comprising:
    a foamed low density set gypsum core having a top surface and a bottom surface, the foamed low density set gypsum core made using a gypsum-containing slurry including stucco, from about 0.5% by weight to about 10% by weight pregelatinized starch, and foam,
    a top non-foamed high density bonding layer having a thickness of about 2 mils to less than about 7 mils covering the top surface of the foamed low density set gypsum core,
    a bottom non-foamed high density bonding layer having a thickness of about 2 mils to less than about 7 mils covering the bottom surface of the foamed low density set gypsum core,
    the top and bottom non-foamed high density bonding layers comprising from about 10% by weight to about 16% by weight of the total amount of the gypsum-containing slurry,
    a top cover sheet, and
    a bottom cover sheet,
    wherein the top cover sheet is bonded to the foamed low density set gypsum core by the top non-foamed high density bonding layer, and the bottom cover sheet is bonded to the foamed low density set gypsum core by the bottom non-foamed high density bonding layer, the foamed low density set gypsum core has a density from about 10 pcf to about 27 pcf and the top and bottom non-foamed high density bonding layers have a density from about 60 pcf to about 70 pcf, and wherein the composite board has a dry weight of about 1000 lb/msf or less for a ½ inch thick board, a nail pull resistance of at least about 77 lb/msf, and a core hardness of at least about 11 lb/msf.

2. The composite light weight gypsum board of claim 1 in which the pregelatinized starch is in the form of a pre-dispersion of about 10% by weight in water.

3. The composite light weight gypsum board of claim 1, wherein the gypsum-containing slurry further comprises a naphthalenesulfonate dispersant present in an amount from about 0.1% by weight to about 3.0% by weight based on the weight of stucco.

4. The composite light weight gypsum board of claim 1, wherein the gypsum-containing slurry further comprises a naphthalenesulfonate dispersant in the form of an aqueous solution containing from about 40% to about 45% by weight naphthalenesulfonate and the aqueous solution is present in the slurry in an amount from about 0.5% to about 2.5% by weight based on the weight of stucco.

5. The composite light weight gypsum board of claim 1, wherein the gypsum-containing slurry further comprises sodium trimetaphosphate present in an amount from about 0.12% by weight to about 0.4% by weight based on the weight of stucco.

6. The composite light weight gypsum board of claim 1, wherein the gypsum-containing slurry further comprises glass fiber present in an amount up to about 0.5% by weight based on the weight of stucco.

7. The composite light weight gypsum board of claim 1, wherein the gypsum-containing slurry further comprises a waterproofing agent.

8. The composite light weight gypsum board of claim 1, wherein the foam is soap foam, and the soap is present in an amount from about 0.3 lb/msf to about 0.5 lb/msf.

9. The composite light weight gypsum board of claim 1, wherein the top cover sheet is paper having a weight of about 60 lb/msf.

10. The composite light weight gypsum board of claim 1, wherein the top cover sheet is a fibrous mat.

11. The composite light weight gypsum board of claim 10, wherein the fibrous mat is a nonwoven glass fiber mat.

12. The composite light weight gypsum board of claim 1, wherein the gypsum-containing slurry has a water/stucco ratio from about 0.7 to about 1.3.

13. A composite light weight gypsum composite board comprising:
    a foamed low density set gypsum core having a top surface and a bottom surface, the foamed low density set gypsum core made using a gypsum-containing slurry including stucco, pregelatinized starch, and foam,
    a top reduced-foamed high density bonding layer having a thickness of about 2 mils to less than about 7 mils covering the top surface of the foamed low density set gypsum core,
    a bottom reduced-foamed high density bonding layer having a thickness of about 2 mils to less than about 7 mils covering the bottom surface of the foamed low density set gypsum core,
    a top cover sheet, and
    a bottom cover sheet,
    wherein the top cover sheet is bonded to the foamed low density set gypsum core by the top reduced-foamed high density bonding layer, and the bottom cover sheet is bonded to the foamed low density set gypsum core by the bottom reduced-foamed high density bonding layer, the foamed low density set gypsum core has a density from about 10 pcf to about 27 pcf and the top and bottom non-foamed high density bonding layers have a density from about 60 pcf to about 70 pcf, and wherein the composite board has a dry weight of about 1000 lb/msf for a ½ inch thick board, a nail pull resistance of at least about 77 lb/msf, and a core hardness of at least about 11 lb/msf.

14. The composite light weight gypsum board of claim 13, wherein the pregelatinized starch is present in an amount from about 0.5% by weight to about 10% by weight based on the weight of stucco.

15. The composite light weight gypsum board of claim 13 in which the pregelatinized starch is in the form of a pre-dispersion of about 10% by weight in water.

16. The composite light weight gypsum board of claim 13, wherein the gypsum-containing slurry further comprises a naphthalenesulfonate dispersant present in an amount from about 0.1% by weight to about 3.0% by weight based on the weight of stucco.

17. The composite light weight gypsum board of claim 13, wherein the gypsum-containing slurry further comprises sodium trimetaphosphate present in an amount from about 0.12% by weight to about 0.4% by weight based on the weight of stucco.

18. The composite light weight gypsum board of claim 13, wherein the foam is soap foam, and the soap is present in an amount from about 0.2 lb/msf to about 0.7 lb/msf.

19. The composite light weight gypsum board of claim 18, wherein the top and bottom reduced-foamed high density bonding layers include about 5% by weight or less of the amount of soap used to make the foamed low density set gypsum core.

20. The composite light weight gypsum board of claim 13, wherein the top cover sheet is paper having a weight of about 60 lb/msf.

21. The composite light weight gypsum board of claim 13, wherein the foamed low density set gypsum core has a density from about 10 pcf to about 27 pcf.

22. The composite light weight gypsum board of claim 13, wherein the top and bottom reduced-foamed high density bonding layers have a density from about 45 pcf to about 60 pcf.

23. A composite light weight gypsum composite board having a dry weight of about 1,000 lb./msf or less for a ½ inch thick board comprising:
   a foamed low density set gypsum core having a top surface and a bottom surface, the foamed low density set gypsum core made using a gypsum-containing slurry including stucco from about 0.5% by weight to about 10% by weight pregelatinized starch, and foam,
   a top non-foamed high density bonding layer having a thickness of about 2 mils to less than about 7 mils covering the top surface of the foamed low density set gypsum core,
   a bottom non-foamed high density bonding layer having a thickness of about 2 mils to less than about 7 mils covering the bottom surface of the foamed low density set gypsum core,
   the top and bottom non-foamed high density bonding layers comprising from about 10% by weight to about 16% by weight of the total amount of the gypsum-containing slurry,
   a top fibrous mat cover sheet, and
   a bottom cover sheet,
wherein the top cover sheet is bonded to the foamed low density set gypsum core by the top non-foamed high density bonding layer, and the bottom cover sheet is bonded to the foamed low density set gypsum core by the bottom non-foamed high density bonding layer, the foamed low density set gypsum core has a density from about 10 pcf to about 30 pcf and the top and bottom non-foamed high density bonding layers have a density from about 60 pcf to about 70 pcf.

24. The composite light weight gypsum board of claim 23 in which the pregelatinized starch is in the form of a pre-dispersion of about 10% by weight in water.

25. The composite light weight gypsum board of claim 23, wherein the gypsum-containing slurry further comprises a naphthalenesulfonate dispersant present in an amount from about 0.1% by weight to about 3.0% by weight based on the weight of stucco.

26. The composite light weight gypsum board of claim 23, wherein the gypsum-containing slurry further comprises sodium trimetaphosphate present in an amount from about 0.12% by weight to about 0.4% by weight based on the weight of stucco.

27. The composite light weight gypsum board of claim 23, wherein the foam is soap foam, and the soap is present in an amount from about 0.2 lb/msf to about 0.7 lb/msf.

28. The composite light weight gypsum board of claim 23, wherein the board has a dry weight from about 900 lb/msf to about 1100 lb/msf.

29. The composite light weight gypsum board of claim 23, wherein the fibrous mat cover sheet is a nonwoven glass fiber mat.

30. A method of making composite light weight gypsum board having a dry weight from about 900 lbs./msf to about 1,100 lbs./msf, comprising the steps of:
   (a) mixing a non-foamed gypsum-containing slurry having a density from about 80 pcf to about 85 pcf comprising water, stucco, pregelatinized starch, and a naphthalenesulfonate dispersant,
   wherein the pregelatinized starch is present in an amount from about 0.5% by weight to about 10% by weight based on the weight of stucco, and wherein the naphthalenesulfonate dispersant is present in an amount from about 0.1% to about 3.0% by weight based on the weight of stucco;
   (b) depositing from about 6% to about 9% by weight of the total amount of the non-foamed gypsum-containing slurry on a first cover sheet;
   (c) adding soap foam to from about 84% to about 90% by weight of the total amount of the non-foamed gypsum-containing slurry to form a foamed gypsum-containing slurry;
   (d) depositing the foamed gypsum-containing slurry onto the non-foamed gypsum-containing slurry on the first cover sheet;
   (e) depositing from about 4% to about 7% by weight of the total amount of the non-foamed gypsum-containing slurry on a second cover sheet;
   (f) placing the non-foamed gypsum-containing slurry-covered surface of the second cover sheet over the deposited foamed gypsum-containing slurry to form a composite light weight gypsum board;
   (g) cutting the composite light weight gypsum board after the foamed gypsum-containing slurry has hardened sufficiently for cutting; and
   (h) drying the composite light weight gypsum board to provide a foamed low density set gypsum core in the finished composite light weight gypsum board.

31. The method of claim 30 in which the pregelatinized starch is in the form of a pre-dispersion of about 10% by weight in water.

32. The method of claim 30, wherein the non-foamed gypsum-containing slurry further comprises sodium trimetaphosphate present in an amount from about 0.12% by weight to about 0.4% by weight based on the weight of stucco.

33. The method of claim 30, wherein the non-foamed gypsum-containing slurry further comprises glass fiber present in an amount up to about 0.5% by weight based on the weight of stucco.

34. The method of claim 30, wherein the non-foamed gypsum-containing slurry further comprises paper fiber present in an amount up to about 1.0% by weight based on the weight of stucco.

35. The method of claim 30, wherein the soap foam includes soap present in an amount from about 0.3 lb/msf to about 0.5 lb/msf.

36. The method of claim 30, wherein the first cover sheet and the second cover sheet are made of paper.

37. The method of claim 30, wherein the first cover sheet is paper having a weight of about 60 lb/msf.

38. The method of claim 30, wherein the first cover sheet is a fibrous mat.

39. The method of claim 38, wherein the fibrous mat is a nonwoven glass fiber mat.

40. The method of claim 30, wherein the foamed gypsum-containing slurry has a water/stucco ratio from about 0.7 to about 1.3.

41. The method of claim 30, wherein the pregelatinized starch is corn starch.

42. A composite light weight gypsum board, comprising:
a foamed low density set gypsum core having a top surface and a bottom surface, the foamed low density set gypsum core made using a gypsum-containing slurry comprising water, stucco, pregelatinized corn starch present in an amount of about 6% by weight based on the weight of stucco, a 45% by weight aqueous solution of a naphthalenesulfonate dispersant present in an amount of about 1.2% by weight based on the weight of stucco, sodium trimetaphosphate present in an amount of about 0.3% by weight based on the weight of stucco, paper fiber present in an amount of about 1% based on the weight of stucco, and glass fiber present in an amount of about 0.5% based on the weight of stucco, and soap foam,
a top non-foamed high density bonding layer having a thickness of about 2 mils to less than about 7 mils covering the top surface of the foamed low density set gypsum core,
a bottom non-foamed high density bonding layer having a thickness of about 2 mils to less than about 7 mils covering the bottom surface of the foamed low density set gypsum core,
the top and bottom non-foamed high density bonding layers comprising from about 10% by weight to about 16% by weight of the total amount of the gypsum-containing slurry,
a top paper cover sheet having a weight of about 60 lb/msf, and
a bottom paper cover sheet,
wherein the top cover sheet is bonded to the foamed low density set gypsum core by the top non-foamed high density bonding layer, and the bottom cover sheet is bonded to the foamed low density set gypsum core by the bottom non-foamed high density bonding layer, wherein the foamed low density set gypsum core has a density of about 25 pcf, the top and bottom non-foamed high density bonding layers have a density from about 60 pcf to about 70 pcf and wherein the composite board has a dry weight of about 1000 lb/msf for a ½ inch thick board, a nail pull resistance of at least about 77 lb/msf, and a core hardness of at least about 11 lb/msf.

43. The composite light weight gypsum board of claim 42 in which the pregelatinized corn starch is in the form of a pre-dispersion of about 10% by weight in water.

* * * * *